ns [11] 3,746,450
Smith, Jr. [45] July 17, 1973

[54] METHOD AND APPARATUS FOR INSPECTING SURFACE TREATED OPHTHALMIC LENSES

[75] Inventor: Luther W. Smith, Jr., Brimfield, Mass.

[73] Assignee: American Optical Corporation, Southbridge, Mass.

[22] Filed: June 26, 1972

[21] Appl. No.: 266,193

[52] U.S. Cl..... 356/135, 350/175 GN, 350/96 WG, 356/124
[51] Int. Cl......................... G01n 21/46, G01b 9/00
[58] Field of Search..................... 356/124, 125, 126, 356/127, 128, 135, 136; 350/175, 96 WG

[56] References Cited
UNITED STATES PATENTS

| | | | |
|---|---|---|---|
| 3,323,410 | 6/1967 | Waters | 356/136 |
| 3,486,808 | 12/1969 | Hamblin | 350/175 GN |
| 3,533,888 | 10/1970 | Eppler et al. | 351/166 |
| 3,586,872 | 6/1971 | Tien | 350/96 WG |

Primary Examiner—Ronald L. Wibert
Assistant Examiner—Conrad Clark
Attorney—William C. Nealon et al.

[57] ABSTRACT

Glass ophthalmic lenses which have been treated by a process of ion exchange provide increased impact resistance and durability. It is necessary that these lenses be inspected to ascertain that the desired penetration of the ion exchange process has occurred prior to dispensing the lenses to the public. This may now be accomplished by introducing into the hardened exterior layer light waves at essentially grazing refraction. Because the hardened outer layer is of compressively stressed nature, the resulting index of refraction is generally higher than that of the interior of the lens. These light waves which were introduced at essentially grazing refraction are confined to the compressively stressed layer and are guided along the surface in a surface wave mode. The surface wave mode energy may be refracted out of the surface layer to provide a positive output signal. If the hardened layer is not present, these rays will not be guided along the surface of the lens but rather will penetrate into the interior of the lens and will provide no output.

19 Claims, 6 Drawing Figures

PATENTED JUL 17 1973 3,746,450

METHOD AND APPARATUS FOR INSPECTING SURFACE TREATED OPHTHALMIC LENSES

BACKGROUND OF THE INVENTION

This invention is related to the inspection of surface treated ophthalmic lenses and is more particularly concerned with novel improved method and apparatus for inspecting surface treated glass ophthalmic lenses and still more particularly those glass ophthalmic lenses which have been treated in an ion exchange chemical hardening process.

Recent regulations which have been promulgated by the federal Food and Drug Administration require that all prescription ophthlamic lenses dispensed within the United States pass certain impact resistance tests. The principal thrust of these regulations is to enhance greatly the impact resistance of glass ophthalmic lenses so as to safeguard against injury to the eyes of the wearer. In order to meet these regulations and yet not form ophthalmic lenses of prohibitive thicknesses, it has become necessary to treat the ophthalmic lenses to improve their impact resistance characteristics.

A fracture in glass always originates at a surface that is in tension and, in general, the degree of tension required to cause failure is controlled by the presence of surface flaws. Thus, the strength of a piece of glass is determined by the strength of its surface. For this reason the strength of annealed glass can be expressed in terms of a critical, or basic, tensile strength which is dependent upon the severity of the surface flaws. With strengthened glass, however, the built-in stresses have to be considered in addition to the basic strength of the surface.

Thermally tempered glass is produced by rapidly cooling glass which has been heated to near the softening point. Glass treated in this manner is characterized by having compressive stress in the surface while the interior of the glass is under tensile stress. The highest value of the compressive stress occurs at the surface of the glass where it plays a major role in determining the strength of the glass article. The overall strength can be expressed as the sum of the basic strength plus the surface compressive stress induced by the tempering process.

A second major method for forming a compressively stressed surface layer in glass articles is a method known commonly as ion exchange. Simply stated, an ion exchange process involves the substitution of a larger monovalent alkali metal ion for a smaller monovalent alkali metal ion in the surface layer of a glass article. This substitution of large ions for small ions causes the surface layer of the glass article to become more densely packed than the interior thereby helping to create a highly compressively stressed layer on the surface while the interior portion of the glass article is tensilely stressed. Another factor which simultaneously contributes to the compressively stressed condition is the alteration of the thermal expansion coefficient caused by the modified composition of the surface layer.

Neither of the foregoing methods alter the appearance of the lens sufficiently so that the presence or absence of the treated surface may be ascertained visually even to one of high skill. Therefore, a method is necessary to determine positively that the lenses have been treated. In the case of the thermally tempered lenses, this presents no problem. Characteristically, glass when it is stressed becomes somewhat birefringent. In the thermally tempered lens, since the absolute level of stress, distributed as a compressively stressed layer on the surface and a tensilely stressed interior, is appreciable throughout most of the body of the lens, a characteristic pattern of interference fringes occurs when the treated lens is held between crossed polarizers. If one attempts to apply the same procedure to lenses which have been hardened in the ion exchange process, similar results do not occur. This is explained by the fact that the compressively stressed surface layer in the chemically treated lens is extremely thin in comparison to the stressed surface layer in the termally tempered lens; therefore, the thickness of glass in a highly stressed condition is much smaller than that in a thermally tempered lens. Hence, the method of using crossed polarizers, while permissible in theory, does not serve as a practical means of testing chemically tempered lenses.

A surface layer having an index of refraction higher than the index of refraction of the underlying substrate in an ophthalmic lens may be formed by other methods as well as the aforementioned ion exchange process. It is equally necessary that a means be available by which the presence of all such higher refractive index surface layers may be ascertained. Therefore, the term "surface treated" will be used to include all such surface layers, regardless of the precise method by which the surface layers are formed. The related term "surface treatment" will refer to the process by which the surface treated layers are formed.

For example, many ophthalmic lenses are now produced from plastic materials. It is sometimes necessary to coat these lenses with a thin layer of a material which is often of a higher index of refraction than the interior of the lens. The crossed polarizers test is again infeasible since, characteristically, the interior of the plastic lens is somewhat birefringent and tends to control the interference fringe pattern observed when the plastic lens is placed between the crossed polarizers.

SUMMARY OF THE INVENTION

Accordingly, it is an object of the present invention to provide a method and apparatus for determining positively whether an ophthalmic lens has been subjected to a surface treatment.

It is a second object of the invention to provide a method and apparatus which are suited particularly for inspection of ophthalmic lenses which have been subjected to an ion exchange surface treatment process.

Another object of the invention is to provide such a method and apparatus which may be utilized in the inspection of surface treated plastic lenses.

A further object is to provide such a method and apparatus which are simple in operation and construction respectively.

A still further object of the invention is to provide such method and apparatus which provide to the operating technician a simple "go-no-go" test for the presence of a surface treated layer on an ophthalmic lens.

Briefly, the invention in its broadest aspect comprises method and apparatus for inspecting an ophthalmic lens for the presence of an outer surface treated layer on a compoundly curved refractive surface of the ophthalmic lens. The outer surface treated layer has a higher index of refraction than the interior of the ophthalmic lens. A launcher member formed of an optical material having a higher index of refraction than the outer surface treated layer is placed in optical contact with the refractive surface and forms a first interface therebetween. A beam of light is directed onto an entrance window on the launcher member. The direction of this beam of light is adjusted both within and without the launcher member to cause rays in the beam of light to approach the first interface at slightly less than the critical angle of total internal reflection. This angle is determined by the refractive indices of the optical material and the outer surface treated layer. The rays are refracted at the first interface at nearly grazing refraction and a portion of the light in propagated subsequently along the surface of the ophthalmic lens as surface waveguide mode radiation only if the outer surface treated layer is present. If the outer surface treated layer is not present, all of the refracted light continues in the lens as transverse waves that are not bound to the surface and may diverge from it. A receiver member, again formed of an optical material having a higher index of refraction than the outer surface treated layer is placed in optical contact with the refractive surface and forms a second interface therebetween. The receiver member is positioned so as to be aligned with any surface guided waves which are propagating along the surface. When the radiation reaches the receiver member, the rays are refracted through the second interface and pass into the receiver member. The presence of these rays is then detactable. The presence thereof indicates that the outer surface treated layer is present on the ophthalmic lens.

Further objects, advantages, and features of the invention will be apparent in the arrangement of the constituent parts, in detail, as set forth in the following specification taken together with the accompanying drawing.

DETAILED DESCRIPTION OF THE PREFERRED EMBODIMENTS

Figure 1:
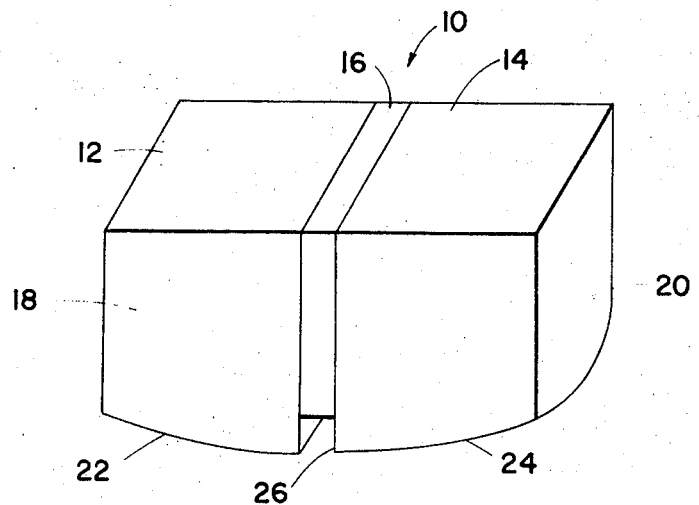
FIG. 1 is an oblique pictorial view of a surface wave transducer useful in the practice of the present invention.

In describing the principles and embodiments of the present invention with reference to the accompanying drawing, like reference numerals will be utilized to identify similar elements of the apparatus.

Referring initially to FIG. 1 of the drawing, there is shown a preferred embodiment of a surface wave transducer indicated by the reference numeral 10 which is central to the inventive concept set forth herein. The surface wave transducer 10 is comprised of three major elements, a launcher member 12, a receiver member 14, and an interposed light absorbing baffle 16. A polished entrance window 18 is formed on the launcher member 12 and, in like manner, a polished exit window 20 is formed on the launcher member 14. The bottom surface 22 of the launcher member 12 and the bottom surface 24 of the receiver member 14 are formed on a common spherical surface. In this embodiment, the light absorbing baffle 16 does not extend to the common spherical surface containing surfaces 22 and 24 thereby leaving a channel 26 separating surfaces 22 and 24.

This embodiment of the invention is designed to be used on concavely curved surfaces, that is, regular minus-spherical and minus-toric (containing both spherical and cylindrical correction) ophthalmic lens surfaces. The radius of curvature for the common spherical surface containing surfaces 22 and 24 is at least as short as the shortest local radius of curvature of any point on the surface of any lenses to be examined with the surface wave transducer.

Figure 2:
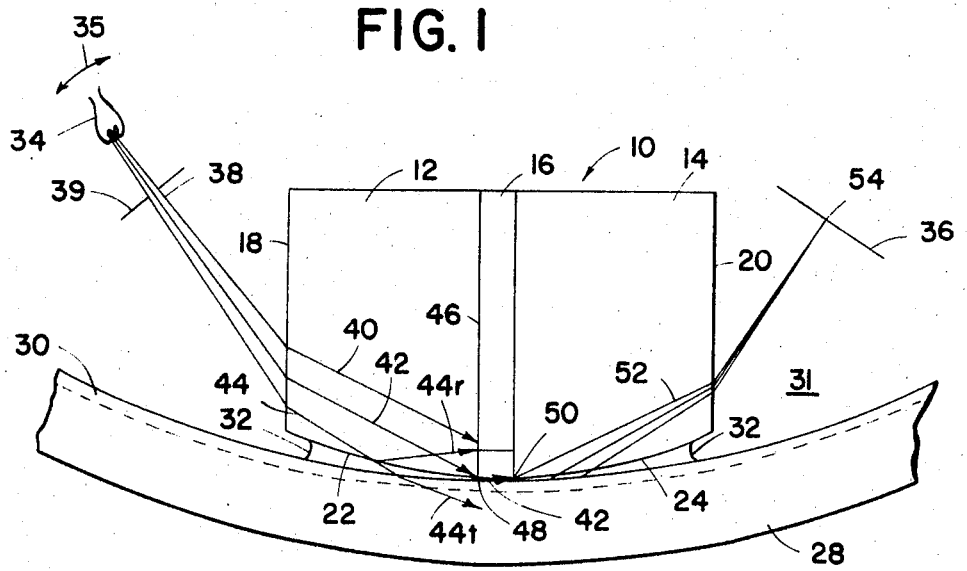
FIG. 2 is a partially schematic, side elevation view of the surface wave transducer of FIG. 1 showing some of the principles of operation of the present invention.

The surface wave transducer 10 as shown in FIG. 1 is employed for launching and receiving surface wave energy by placing it, as shown in FIG. 2, in optical contact with suitable waveguide structure. In this instance, the waveguide structure is comprised of an ophthalmic lens 28 having a chemically tempered surface portion 30 on the concave surface thereof. The waveguide "structure" is to be thought of as containing three distinct regions; (1) the substrate of the ophthalmic lens 28 that supports the tempered layer 30 and which blends imperceptibly into the layer when the waveguide is induced in an otherwise homogeneous material by ion exchange treatment of the exposed surface; (2) the chemically tempered layer 30 itself; and (3) the region 31 external to the surface and generally occupied by air or some material other than the substrate material or the layer material. The refractive indices of these three regions in all areas except where the surface wave transducer or a member thereof has been placed are in the following order:

$$n_{30} > n_{28} > n_{31}.$$

The launcher and receiver member portions 12 and 14 of the surface wave transducer 10 must each have an index of refraction which exceeds that of the waveguide layer 30. A film of clear optically transparent fluid 32 having an index of refraction near to that of the launcher and receiver members and higher than the index of refraction of the waveguide layer 30 is introduced between the surface wave transducer 10 and the waveguide layer 30 so as to be drawn up by surface tension and capillary action to form two approximately semi-circular annular rings of fluid in intimate contact with the common bottom surface portions of the surface wave transducer 10 and the waveguide layer 30 around the points where they touch each other, indicated at 48 and 50. A strip of the waveguide transverse to the path of propagation is thus left uncovered where the channel 26 crosses the surface of the waveguide layer 30.

A divergent beam of optical radiation 38 is derived from a source 34 of small area and is directed at the launcher entrance window 18 at such an angle that by refraction it is directed into the fluid film 32 and strikes the fluid-waveguide layer interface at or near to the critical angle for total internal reflection. This angle is a function of the respective indices of refraction of the waveguide layer and the interfacing fluid. Preferably, the illuminated area should be close to the forward edge 48 of the launcher member 12. The double-headed arrow indicated by reference numeral 35 represents the adjustability of the position of the source 34 which is necessary so that the intersection of the beam of light 38 with the waveguide-fluid interface may be properly positioned along the interface and at the proper angle thereto.

When the beam has been thus properly adjusted some of the energy contained therein is transferred into the waveguide from the refracted beam and is guided along underneath the barrier gap covered by the channel 26 by the waveguide layer 30. Ray 42 is an example of such a conducted ray. Some of the energy which enters the launcher member 12 immediately strikes the interface 46 between the launcher member 12 and the light absorbing baffle 16 and is absorbed at that point. Such a ray is shown at 40. In addition, some of the energy, as represented by ray 44 strikes the surface 22 at an angle such that a portion thereof 44r is reflected at that surface and is once again absorbed by the baffle 16. A second portion of that ray may be transferred to the refractive surface but is not at an angle of grazing refraction and is, therefore, transmitted through the waveguide layer 30 into the substrate 28 and lost. Only that portion of the energy which upon entering the waveguide layer 30 is at or near grazing refraction will be conducted along the surface of the waveguide layer 30. Since the surface along which the surface wave energy is being propagated is of a curved nature, some of that energy will necessarily leak out into the interior of the substrate 28 and will also be lost. However, in spite of these losses, a large portion of the energy transmitted in the surface wave mode arrives at the leading edge 50 of the receiver member 14. There, because of the layer of high index of refraction fluid 32, the energy is refracted out of the waveguide layer 30 and into the receiver member 14 through surface 24. The received energy as indicated by beam 52 is then refracted into the surrounding medium 31 at the receiver exit window 20. The energy is detected by any suitable energy detector. A visual indication is shown at 54 on a ground glass viewing screen 36.

It will be appreciated that, in the idealized condition as shown in FIG. 2, the fluid films, the curvature of the lower surface of the receiver member 14, and the curvature of the waveguide layer 30 all contribute to prevent any optical energy from exiting from the receiver exit window 20 unless that energy has been guided along the surface in a bona fide surface wave mode. If a waveguide layer 30 is absent from the surface, or if the thickness and/or index of refraction of the layer 30 are such that a surface wave mode cannot be established for the optical wavelengths in the illuminating beam 38, then no optical energy will exit from the receiver member 14 even though all other conditions for waveguide propagation have been established.

Figure 3:
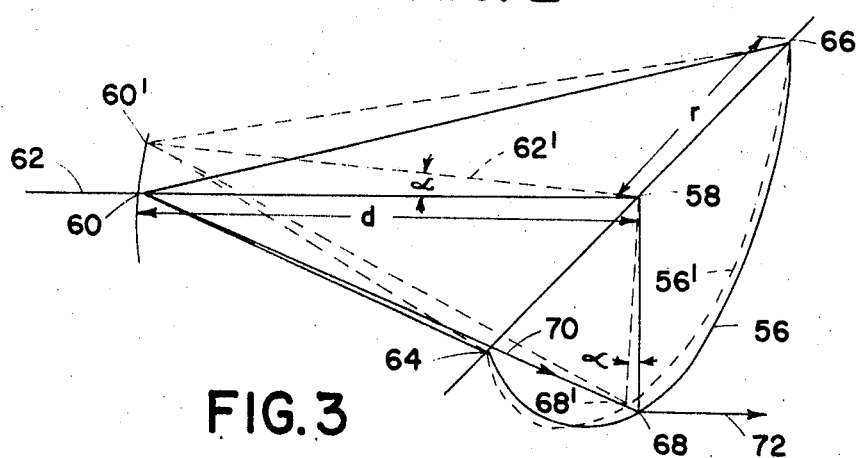
FIG. 3 is a schematic diagram useful in describing other features of operation of the present invention.

It is now necessary to consider in greater detail what those conditions necessary for propagation are. Referring now to FIG. 3, there is shown a spherical interface 68 between two optical media, the upper one of which is homogeneous and of higher index of refraction than that of the lower. The lower medium, which has a concave upper surface, may have a waveguide layer in or on that surface. It is desired to refract optical energy through the interface 68 from the upper medium into the lower medium such that the refracted energy is launched nearly parallel to the surface at the point of refraction. The geometry of a source that will do this efficiently can be visualized by the following construction. Reference numeral 56 refers to half of a great circle that fits on the spherical refracting interface 68. This great circle is allowed to establish the direction in which it is desired to launch energy, i.e., the direction of propagation is to be perpendicular to the plane of that great circle. The planes of incidence of rays, hereafter called rays of critical refraction, that will be tangent to the circle after refraction are seen to all intersect on the normal 62 to the plane of the circle 56 projected back through the center of the circle 58. A ray 70 that refracts at the nadir 68 of the circle is shown. It and the normal 62 to the great circle 56 establish a plane called the normal plane. The intersection of the rays such as 70 is denoted by reference numeral 60. The distance d between the point of intersection 60 and the center 58 is determined by the radius $r$ of the circle 56 and the relative refractive indices of the two optical media, $n_1$ for the upper medium, and $n_2$ for the superficial layers of the lower medium, according to the well known Snell's law for refraction.

$$n_1 \sin \theta = n_2 \sin 90°$$

(1)

where $$\sin \theta = d/(d^2 + r^2)$$

(2)

That is $$d = rnhd\ 2/(n_1^2 - n_2^2)\ )$$

(3)

In general, the indices of refraction $n_1$ and $n_2$ vary somewhat with wavelength $\lambda$ so that the refraction is dispersive. However, it will be appreciated that unless the two media are of very nearly the same refractive index while simultaneously having different dispersion values, the distance $d$ is substantially constant throughout the optical spectrum of wavelengths. A point source of light at intersection 60 launches optical energu efficiently at all points on the interface that lie on the great circle 56.

Launch points on a nearby great circle 56' that intersects great circle 56 at the two poles 64 and 66 is inclined to it at an angle 60 calls for rays of critical refraction emanating from a source at point 60'. Point 60' is also located in the aforementioned normal plane at a distance $d$ from center 58 but along a line 62' inclined to normal 62 by the angle $\alpha$. It can be seen that a continuum of great circles that would completely cover the spherical interface requires a continuous line of point sources forming a circular arc in the normal plane. The arc should have a radius $d$ and be centered on the center of curvature 58 of the spherical interface 68 and should subtend an angle equal to that subtended by the launching (refracting) area along the direction of launch.

If, now, other refracting or reflecting surfaces or elements are interposed between an actual source and the spherical refracting interface they should be so disposed and shaped that the projected image of the source, be it real or virtual, will assume the arced outline described here for the most efficient launching of the optical energy available from that source.

The foregoing equations also apply to the surface guided energy that is refracted out of the waveguide into a receiver such as 14 in FIG. 1. The received beam is, in general, astigmatic and chromatic. Close to the receiver area the beam will be spread out in a sensibly horizontal pattern such as denoted by reference numeral 74 in FIG. 5 with a cross-section that approximates the receiver area as projected onto the direction of the outgoing beam. Rays of differing wavelengths will exit at slightly different angles so that the beam diverges chromatically in the plane of FIG. 2 while it converges in the direction normal to that plane. At the distance $d$ the beam will have collapsed entirely into the plane so that it has a line cross-section along an arc in the plane.

If the line source discussed with relation to FIG. 3 is allowed to have lateral extent, energy can be launched in a fan of rays along the interface; the angle subtended by those rays will be a direct function of the lateral angle subtended by the source as measured from the center 58. Received radiation will collapse toward the normal plane of the receiver to form a beam with minimum lateral dimension directly related to that of the source. If the launcher and receiver members are identical, the two lateral dimensions will be equal otherwise there can be either magnification or demagnification depending upon the relationships therebetween.

It must be stressed at this time that although the foregoing discussion has centered around a surface wave transducer which integrally combines the launcher and receiver members with the interposed light absorbing baffle, the invention is equally operable with separate launcher and receiver members. Such an integrated structure as has been described merely forms a convenient configuration for manufacture and use. As separate elements, the launcher and receiver members may be of differing configurations and materials and may be individually emplaced on the ophthalmic lens. In addition, the light-absorbing baffle may be eliminated when the launcher and receiver members are separate. A major function of the baffle is to align, space, and relatively preposition the launcher and receiver members. Unless some other light absorbing or blocking means is interposed between the launcher and receiver members, some slight degradation in performance will occur since some of the stray radiation normally absorbed will mix with the received signal and will cloud that signal.

Thus far only the presence of a high index of refraction surface layer attained by a process of ion exchange on the surface of the ophthalmic lens has been considered. It should be noted once more that the foregoing apparatus will perform equally well on any suitable waveguide structure on a lens surface whatever its origin.

While, theoretically, the device just described should function equally well on a lens which has been thermally tempered, preliminary results indicate that the performance is considerably superior on chemically tempered lenses. Therefore, while thermally tempered lenses are included within the purview of the invention, the preferred mode of operation is on chemically tempered lenses.

It should be noted that the launching and receiving of surface guided optical waves for the purpose of examining certain characteristics of a surface waveguide, conducting optical radiation, or transmitting optical images or telecommunication information at optical frequencies has been developed as an art and a science. Devices for such purposes have been designed primarily for operation on flat waveguides or have been developed for flat launching and receiving areas on a waveguide which may be otherwise curved between the launching and receiving areas. A detailed explanation of surface guided waves is given in U.S. Pat. No. 3,489,481.

The present invention is also embodied within a novel method for inspecting opthalmic lenses for the presence of an outer surface treated layer of higher refractive index than an underlying substrate. The method comprises the placement of a launcher member 12, referring once more to FIG. 2, which is formed of an optical material having a higher index of refraction than the outer surface treated layer in optical contact therewith as by interposing an optically clear fluid 32 therebetween. A beam of light 38 is directed onto an entrance window 18 on that launcher member. The direction of the beam of light 38 is adjusted such that as the rays are first refracted by the interface between the surrounding medium 31 and the launcher member 12, i.e., at the entrance window 18, and later at the interface between the fluid 32 and the outer surface treated layer 30, so that the rays may approach the interface at slightly less than the critical angle of total internal reflection. That angle as was noted hereinabove is determined by the refractive indices of the interfacing materials. The rays are then refracted at the interface at nearly the grazing angle and are propagated along the surface of the lens if and only if the outer surface treated layer is present. If no layer of higher index of refraction material is disposed upon the surface of the ophthalmic lens, the rays will not be guided along the surface thereof but will pass into the lens. A receiver member is placed in optical contact with the surface thereby forming a second interface therewith. The receiver member is positioned on the surface so as to be aligned with any rays propagating along that surface and spaced from the previously placed launcher member. The receiver member 14 is also formed of an optical material having a higher index of refractiOn than the outer surface treated layer 30 so that when the rays propagating along the surface of the layer 30 reach the receiver member, these rays are refracted through the second interface into the receiver member. The presence of these rays is then detected as they exit through the exit window 20 on the receiver member. The presence of exiting rays indicates that the high index of refraction layer of material is present on the surface of the ophthalmic lens.

Figure 5:
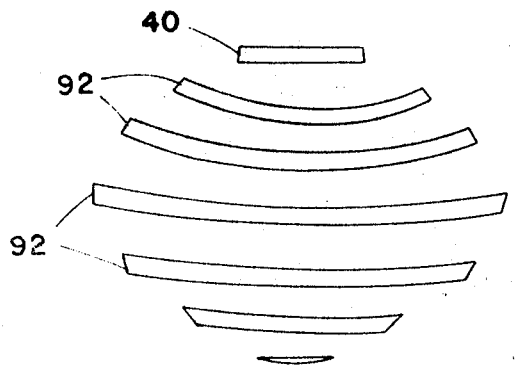
FIG. 5 is a representation of the output pattern formed on a ground glass screen for a typical chemically hardened ophthalmic lens.

Many modifications of the apparatus and method described herein will be obvious to one of ordinary skill in the art. For example, although the launcher and receiver have been described hereinabove as being emplaced on the concave surface of the ophthalmic len, a similar test may be performed on the convex surface of the lens. The difference between the two approaches and the reason for which it is preferred to use the concave surface is that a certain portion of the light reaching the interface between the launcher member and the surface of the ophthalmic lens is transmitted through that interface into the interior of the lens, for example, as shown by ray 44t in FIG. 2. When the inspection is performed on the convex surface of the lens, a certain portion of this transmitted light travels across the chord of the exposed surface and is captured by the receiver member. This radiation forms a constant background of light against which the received chromatic pattern such as shown in FIG. 5 is displayed rather than the dark background present when utilizing the concave surface of the lens.

Figure 6:
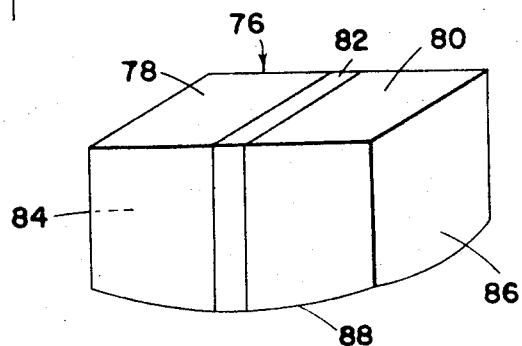
FIG.6 is an oblique pictorial view of a second form of the surface wave transducer according to the invention.

Another modification of the invention is shown in FIG. 6. In this embodiment, the light absorbing baffle 82 which is disposed between the launcher member 78 and the receiver member 80 of a surface wave transducer 76 is now coterminated with the bottom surfaces of the launcher and receiver members 78 and 80 on a common spherical surface 88. The entrance window and exit window 84 and 86 respectively are provided as in the previous embodiment. This embodiment takes advantage of the fact that the waveguide mode energy contained within the surface layer on the lens "leaks" back into a region of higher refractive index at a relatively slow rate. Therefore, when a surface wave transducer such as 76 is rested on a surface of shallower curvature and fluid of an appropriate index of refraction is introduced therebetween to form a complete annular ring around the point of contact, the baffle may have appreciable thickness, such as 3 millimeters, along the direction of propagation and substantial amounts of surface guided energy still reach and exit from the receiver member. In addition, interreflctions in the fluid filled, wedge-shaped region between the two solid surfaces of waveguide versus launcher-baffle-receiver combination cause additional energy to exit from the receiver. These additional beams, see FIG. 5, exit at angles a few degrees different from that of the more fundamental surface guided wave 90 so that the beam is then accompanied by additional, astigmatic, chromatic beams 92 which help to locate the more fundamental surface guided beam. The number of such beams 92 appears to depend on the radius of the surface being examined. The longer the surface radius is, the fewer the additional beams 92.

Other modifications to the apparatus include the incorporation of the detecting means directly into the receiver member. Such a detecting means might provide either a visual or electrical output in response to received energy.

Figure 4:
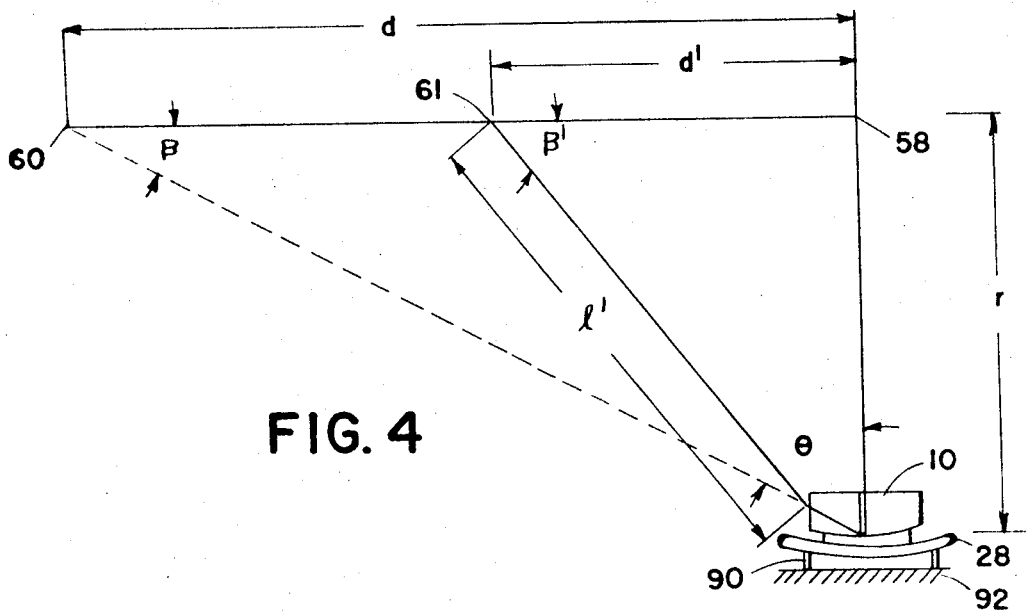
FIG. 4 is a diagrammatic lay-out of the device of the present invention useful for describing the operational configuration of the invention.

A specific example of a surface wave transducer, according to the embodiment of FIGS. 1 and 6, has been found to be particularly effective on ophthalmic lenses where the waveguide medium has an index of refraction substantially equal to 1.523 and a minimum radius of curvature of approximately 100 millimeters. The launcher and receiver members are formed of the same material which has an index of refraction substantially equal to 1.624. By reference to equations (1) and (3) the rays of critical refraction should strike the launching area and exit from the receiving area at substantially the angle of incidence, $\theta$, equal to 69° 40', and the distance $d$ should be approximately 288mm. In this example, the upper (launcher) medium was terminated in the manner of FIG. 2 by a planar interface called an entrance window, so that the source could be a lamp separated from the surface wave transducer. This also allowed for relative adjustment to be made between the transducer and the source of light. The source, baffled by a diaphragm 39 so as to illuminate only the entrance window 18, was a concentrated filament lamp set approximately 17.8 centimeters from the window and elevated above it so that the line of sight from the filament to the center of the window was about 43°. Surface guided energy from the receiver was viewed as a pattern of illumination on a ground glass screen placed about one centimeter from the exit window and angled with respect to it by approximately 30°. These dimensions were nearly optimum according to the equations as modified to account for refraction at the entrance and exit windows. Thus, in use, the planar entrance window 18 was substantially perpendicular to the normal 62 of FIG. 3, i.e., was parallel to the great circle 56. If rays of critical refraction for a great circle such as 56 are extended back through such a window, they will intersect more or less perfectly at a point on the normal 62 nearer than 60 to the center 58. This point is shown by reference numeral 61 in FIG. 4. Rays of critical refraction for other great circles such as 56' intersect at points above the normal 62, but a contimuum of such points is no longer a circular arc. A launcher area in this example extended about 11 millimeters along the direction of launching thereby subtending an arc of about 6° 20'. That means that rays of critical refraction within the launching beam should strike the interface with grazing angles between 20° 20' and 26° 40'. Refraction at the entrance window widens and alters this band of permissible launch angles to 34° 20' through 46° 50' with respect to a horizontal direction, this is shown by angle $\beta'$ in FIG. 4. Correspondingly, the new distances $d'$ from the center of curvature of the launch area range between 93.8 millimeters and 146.4 millimeters. The slant length 1' ranges between 13.7 centimeters and 17.7 centimeters. Since the regions nearest the leading edge of the launch area are the most effective for launching surface waves, a source of limited extent should be placed about 17.7 centimeters from the entrance window and at such a height above the launch area that the angle of sight from the source to the window is somewhat more than 34°. These distances and angles have been verified experimentally as being nearly optimal for the launcher-waveguide-receiver combination as shown in FIG. 4. The adjustments are not critical, however, which makes the device easy to operate even by a technician of little formal technical training as will be found in many ophthalmic lens dispensing operations.

While there have been shown and described what are considered to be preferred embodiments of the present invention, it will be obvious to those skilled in the art that various changes and modifications, such as the inclusion of curved or inclined windows on the launcher and receiver members, the utilization of either planar or curved reflective surfaces in conjunction with the various refractive surfaces and the inclusion of a flexible member in the slot 26 of FIG. 1 wherein the index of refraction of the member is lower than that of the waveguide layer, may be made therein without departing from the invention.

I claim:

1. A method for inspecting an ophthalmic lens for the presence of an outer surface treated layer on a compoundly curved refractive surface of the ophthalmic lens, the outer surface treated layer having a higher index of refraction than the interior of the ophthalmic lens, the method comprising the steps of:

placing a launcher member formed of an optical material having a higher index of refraction than the outer surface treated layer in optical contact with the refractive surface and forming a first interface therebetween;

directing a beam of light onto an entrance window on the launcher member;

adjusting the direction of the beam of light both within and without the launcher member to cause rays in the beam of light to apProach the first interface at slightly less than the critical angle of total internal reflection as determined by the refractive indices of the optical material and the outer surface treated layer so that the rays are refracted at the first interface at nearly grazing refraction and are propagated along the surface as surface waveguide mode radiation only if the outer surface treated layer is present;

placing a receiver member formed of an optical material having a higher index of refraction than the outer surface treated layer in optical contact with the refractive surface and forming a second interface therebetween;

positioning the receiver member to be aligned with any surface waveguide mode radiation propagating along the surface, the radiation entering through the second interface and passing into the receiver member; and detecting the presence of any radiation entering from the receiver member, the presence thereof indicating that the outer surface treated layer is present on the ophthalmic lens.

2. The method according to claim 1, further including the steps of placing an amount of an optically clear intermediate fluid between the refractive surface and each of the launcher and receiver members sufficient to create good optical contact therebetween, the intermediate fluid having an index of refraction higher than the index of refraction of the outer surface treated layer.

3. The method according to claim 2, further including the step of preventing any light from passing from the launcher member to the receiver member other than through the outer surface treated layer.

4. The method according to claim 3, in which light is prevented from passing from the launcher member to the receiver member by interposing a light absorbing baffle.

5. The method according to claim 4, further including the step of forming the launcher member, the interposed light absorbing baffle, and the receiver member into an integral surface wave transducer unit having a common spherical surface thereon for contacting the refractive surface.

6. The method according to claim 1, wherein the method is performed on a concavely curved refractive surface.

7. The method according to claim 1, further including the step of forming the beam of light into a narrowly divergent beam.

8. Apparatus for inspecting an ophthalmic lens for the presence of an outer surface treated layer on a compoundly curved refractive surface of the ophthalmic lens, the outer surface treated layer having a higher index of refraction than the interior of the ophthalmic lens, the apparatus comprising:

a launcher member formed of an optical material having a higher index of refraction than the outer surface treated layer for placing in optical contact with the refractive surface and forming a first interface therebetween;

a light source for generating a beam of light which impinges on an entrance window on the launcher member;

means for adjusting the direction of the beam of light both within and without the launcher member to cause rays in the beam of light to approach the first interface at slightly less than the critical angle of total internal reflection as determined by the refractive indices of the optical material and the outer surface treated layer so that the rays are refracted at the first interface at nearly grazing refraction and are propagated along the surface as surface waveguide mode radiation only if the outer surface treated layer is present;

a receiver member formed of an optical material having a higher index of refraction than the outer surface treated layer for placement in optical contact with the refractive surface and forming a second interface therebetween, the receiver member being aligned with any surface waveguide mode radiation propagating along the surface, the radiation entering through the second interface and passing into the receiver member; and means for detecting the presence of any radiation entering the receiver member through the second interface, the presence thereof indicating that the outer surface treated layer is present on the ophthalmic lens.

9. The apparatus according to claim 8, in which the surfaces of the launcher and receiver members which are emplaced on the ophthalmic lens are convex spherical surfaces the radii of which are at least as short as the shortest local radius of curvature on the concave surface of the ophthalmic lens.

10. The apparatus according to claim 9, in which a film of an optically clear intermediate fluid is located between the refractive surface and each of the launcher and receiver members sufficient to create good optical contact therebetween, the intermediate fluid having an index of refraction higher than the index of refraction of the outer surface treated layer.

11. The apparatus according to claim 9, in which means are included for preventing any light from passing from the launcher member to the receiver member other than through the outer surface treated layer.

12. The apparatus according to claim 11, in which light is prevented from passing from the launcher member to the receiver member by an interposed light absorbing baffle.

13. The apparatus according to claim 12, in which the launcher member, the interposed light absorbing baffle, and the receiver member are joined together into an integral surface wave transducer, the contacting surfaces of the launcher member and receiver member portions of the surface wave transducer are formed as a common spherical surface.

14. The apparatus according to claim 13, in which the interposed light absorbing baffle also forms a portion of the common spherical surface with the launcher and receiver members.

15. The apparatus according to claim 14, in which the entrance window on the launcher and an exit window on the receiver are a pair of parallel end face windows formed on the surface wave transducer, for the passing of light into and out of the surface wave transducer.

16. The apparatus according to claim 15, in which the means for detecting includes a ground glass screen disposed essentially normal to the rays of light exiting from the receiver member.

17. The apparatus according to claim 8, in which means are included for forming the beam of light into a narrowly divergent beam.

18. The apparatus according to claim 8, wherein the outer surface treated layer is an outer compressively stressed layer on the ophthalmic lens.

19. The apparatus according to claim 18, wherein the outer compressively stressed layer is formed by a process of ion exchange.

* * * * *